US009105160B1

(12) United States Patent
Shackleford et al.

(10) Patent No.: US 9,105,160 B1
(45) **Date of Patent: *Aug. 11, 2015**

(54) DOUBLE DRAW VIDEO POKER GAMES

(75) Inventors: Michael Shackleford, Las Vegas, NV (US); Jon Muskin, Philadelphia, PA (US)

(73) Assignee: Wizard of Odds Consulting, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/481,872

(22) Filed: May 28, 2012

Related U.S. Application Data

(63) Continuation of application No. 12/766,929, filed on Apr. 26, 2010, now Pat. No. 8,187,071, which is a continuation of application No. 10/662,367, filed on Sep. 16, 2003, now Pat. No. 7,704,136.

(51) Int. Cl.

| | |
|---|---|
| ***A63F 9/24*** | (2006.01) |
| ***A63F 13/00*** | (2014.01) |
| ***G07F 17/32*** | (2006.01) |

(52) U.S. Cl.
CPC ........ *G07F 17/3293* (2013.01); *G07F 17/3262* (2013.01); *G07F 17/3267* (2013.01)

(58) Field of Classification Search
USPC ........................... 463/11, 20, 13, 16; 273/292
See application file for complete search history.

(56) References Cited

U.S. PATENT DOCUMENTS

| | | | | |
|---|---|---|---|---|
| 6,098,985 | A * | 8/2000 | Moody | 273/292 |
| 6,416,407 | B1 * | 7/2002 | Carrico et al. | 463/13 |
| 6,592,456 | B2 * | 7/2003 | Walker et al. | 463/13 |
| 6,595,520 | B1 * | 7/2003 | Richards et al. | 273/292 |
| 2004/0043807 | A1 * | 3/2004 | Pennington | 463/13 |
| 2004/0224743 | A1 * | 11/2004 | Tarantino | 463/11 |
| 2004/0248641 | A1 * | 12/2004 | Jarvis et al. | 463/20 |

* cited by examiner

*Primary Examiner* — Steven J Hylinski
(74) *Attorney, Agent, or Firm* — Muskin & Farmer LLC

(57) ABSTRACT

A method, apparatus, and computer readable storage medium for implementing improvements in video poker games. A second draw can be offered to the player, allowing the player an additional chance to improve the player's hand. The second draw can be always offered or triggered upon predefined conditions.

4 Claims, 14 Drawing Sheets

DOUBLE DRAW VIDEO POKER GAMES

CROSS REFERENCE TO RELATED APPLICATIONS

This application is a continuation application of U.S. application Ser. No. 12/766,929, filed on Apr. 26, 2010 which is a continuation application of U.S. application Ser. No. 10/662,367 (now U.S. Pat. No. 7,704,136) filed on Sep. 16, 2003, both applications of which are incorporated by reference herein in their entireties.

BACKGROUND OF THE INVENTION

1. Field of the Invention

The present invention is directed to a method, device, and computer readable storage medium for implementing a video poker game which provides a player with two draws.

2. Description of the Related Art

Video poker is a popular gambling game found in casinos. What is needed is a new variety of game that some players may prefer.

SUMMARY OF THE INVENTION

It is an aspect of the present invention to provide improvements and innovations in video poker games.

The above aspects can be obtained by a system that includes (a) offering a paytable reflecting an ability of a player to receive two draws, the paytable comprising ranks and respective payouts; (b) dealing a first five card hand to the player; (c) allowing the player to make a first selection comprising any number of cards from the first hand; (d) replacing cards in the first selection with newly dealt cards to form a second hand; (e) allowing the player to make a second selection comprising any number of cards from the second hand; (f) replacing cards in the second selection with newly dealt cards to form a final hand; (g) determining the rank of the final hand; and (h) paying the final hand according to the rank's respective payout using the parable.

The above aspects can also be obtained by a system that includes (a) dealing a first five card hand to the player; (b) allowing the player to make a first selection comprising any number of cards from the first hand; (c) replacing the cards from the first selection with newly dealt cards to form a second hand; and (d) if the second hand meets a predefined condition, allowing the player to make a second selection comprising a card or cards from the second hand and replacing the selected card or cards from the second selection with newly dealt cards to form a final hand.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
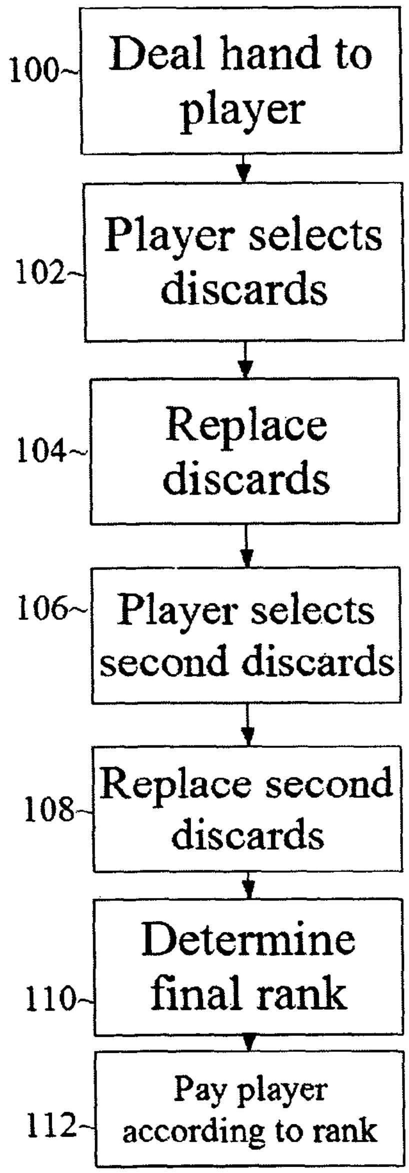
FIG. 1 is a flowchart illustrating the operation of a main embodiment of the present invention, according to an embodiment of the present invention.

Reference will now be made in detail to the presently preferred embodiments of the invention, examples of which are illustrated in the accompanying drawings, wherein like reference numerals refer to like elements throughout.

The present invention relates to video poker games and improvements thereof.

The present invention provides for a video poker game played on a video poker machine allowing the player to take two draws after being dealt an initial first hand. The goal of the game is for the player to make the best hand the player can make. Five cards are dealt to the player from a standard 52 card deck to form a first hand. The player can then choose to discard none or as many of the five cards as the player chooses from the first hand. The video poker machine then deals cards to replace the discarded cards, forming a second hand. The player once again has the option to discard none or as many of the five cards as the player chooses from the second hand. The video poker machine then deals cards to replace the discarded cards forming a third and final hand.

When the player is dealt the third and final hand, a rank of the hand is determined. A rank of the hand is a category that the hand falls into. For example, the following all can represent ranks of a video poker hand: royal flush, straight flush, four of a kind, full house, straight, three of a kind, two pair, jacks or better, one pair, or any other categorical type of hand.

A paytable is offered at the start of the game which reflects the ability of the player to have two draws. Since the player has the advantage of getting two draws, a standard paytable should be reduced so that the casino can still profit from offering the game. The paytable pays a predetermined amount for each hand rank. A paytable comprises a list of hand ranks and respective payouts.

Typically, only the rank of the third and final hand is determined and paid according to a paytable, while the first and second hands are not paid, with the paytable adjusted accordingly. In another embodiment of the present invention, the rank of the first and/or second and/or third hand can be both determined and paid according to a paytable adjusted for those particular rules. Also typically, the player pays up-front for the ability to get two draws, although less preferred variations could also charge the player for the ability to receive any one or both draws FIG. 1 is a flowchart illustrating the operation of a main embodiment of the present invention, according to an embodiment of the present invention.

The game starts at operation 100, which deals to a player a first five card hand. Before a hand is dealt, any needed initialization process can be performed, such as shuffling a 52 card deck. Also, money for playing the game is collected.

The game then proceeds to operation 102, which allows the player to select from 0-5 cards from the first hand to be discarded. This can be done using any known input method, such as a touch sensitive screen, physical buttons, mouse, etc. Once a player is satisfied with his or her selections, the player can then press a button indicating that the player is finished selecting.

The game then proceeds to operation 104, which then automatically replaces the selected cards from operation 102 with newly dealt cards, forming a second hand.

The game then proceeds to operation 106, which allows the player to select from 0-5 cards from the second hand to be discarded. This selection can be done in the same manner as the first selection in operation 102.

The game then proceeds to operation 108, which then automatically replaces the selected cards from operation 106 with newly dealt cards, forming a third and final hand.

The game then proceeds to operation 110, which then determines the rank of the final hand. The rank can be determined by comparing the cards in the final hand with values for each of the ranks. Sorting the final hand from lowest to highest before comparing can make this process easier to program.

The game then proceeds to operation 112, which pays the player according to the determined rank. The payment is determined using a paytable for that game. If the player does not have a winning hand, the player is not paid. The game can then return to operation 100 for a new game.

Figure 2:
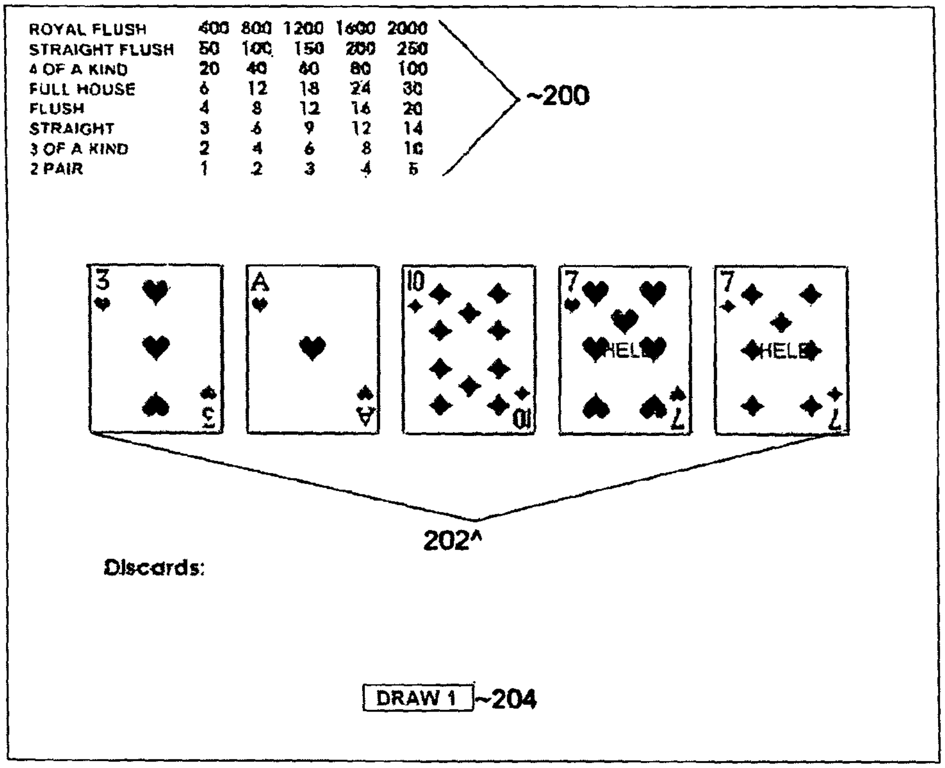
FIG. 2 is a screen shot illustrating a first phase of the present invention, according to an embodiment of the present invention.

FIG. 2 is a screen shot illustrating a first phase of the present invention, according to an embodiment of the present invention.

A paytable 200 is displayed which indicates how much each rank pays depending on how many coins bet. In order to play the game, a player must typically pay up front (either insert cash or use credits) to play a hand of the game. A first hand 202 is also displayed comprising five cards: 3 hearts, ace hearts, 10 diamonds, 7 hearts, and 7 diamonds. Not pictured is a coin output which outputs to the player how many coins/credits the player has.

The player can choose to hold/discard any number and any choices of the initial deal 202. The player can indicate his or her selections by pressing buttons on a video poker machine, touching a screen itself, or using any other input device. In this example the two 7's are held by the player. An indicator such as "HELD" can be displayed alongside the held cards. This corresponds to operation 102 from FIG. 1.

Once the player is satisfied with the cards that are held, the player can then select a "Draw 1" button 204 and proceed to the second phase of the game.

Figure 3:
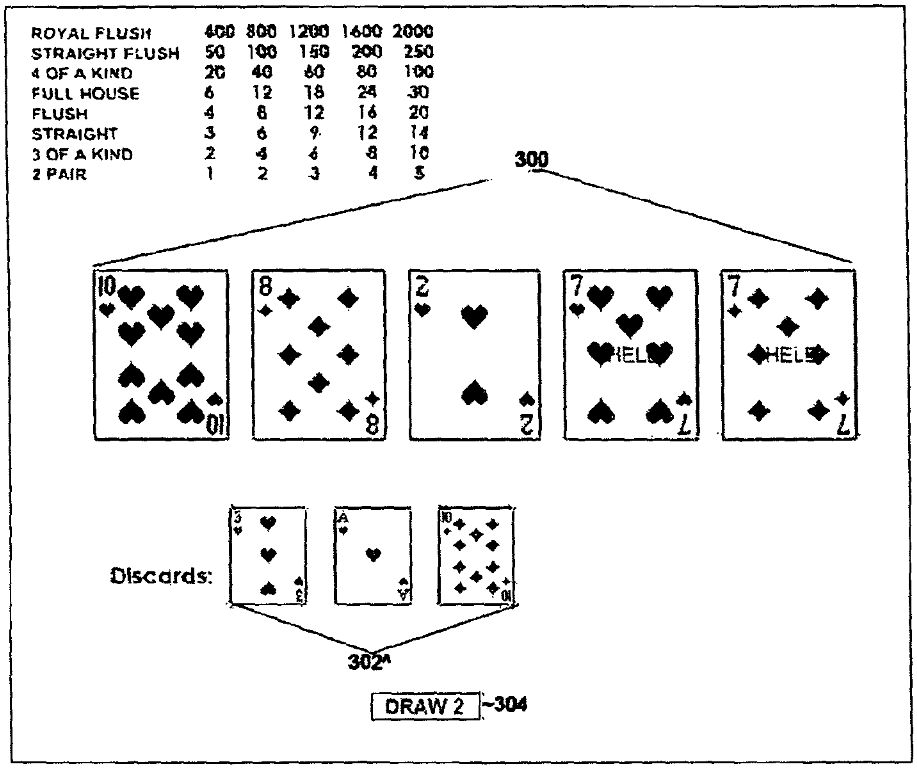
FIG. 3 is a screen shot illustrating a second phase of the present invention, according to an embodiment of the present invention.

FIG. 3 is a screen shot illustrating a second phase of the present invention, according to an embodiment of the present invention.

In the second phase of the game, the computer (video poker machine) holds the cards selected to be held and replaces the non-held cards with new cards (see operation 104 from FIG. 1). A second hand 300 is displayed which comprises the held cards (7 hearts, 7 diamonds) as well as new cards which replaced the non-held cards (10 hearts, 8 diamonds, 2 hearts).

An optional discard output 302 can be displayed which displays the cards which were discarded from the first phase of the game. These cards are displayed so that the player can take into consideration which cards were discarded when choosing which cards to hold/discard for the second draw. For example, if the player has four to a royal flush on the second hand, but one of the discarded cards is the card the player needs to complete the royal flush, then the player should not discard only one card to try for the royal flush since it would be impossible to make.

The player then makes a second selection of cards he or she wishes to hold/discard from the second hand in the same manner as before, See operation 106 from FIG. 1. In this example the payer keeps the two 7's and discards the other 3 cards.

When the player wishes to proceed to the final phase of the game, the player can press the "Draw 2" button 304.

Figure 4:
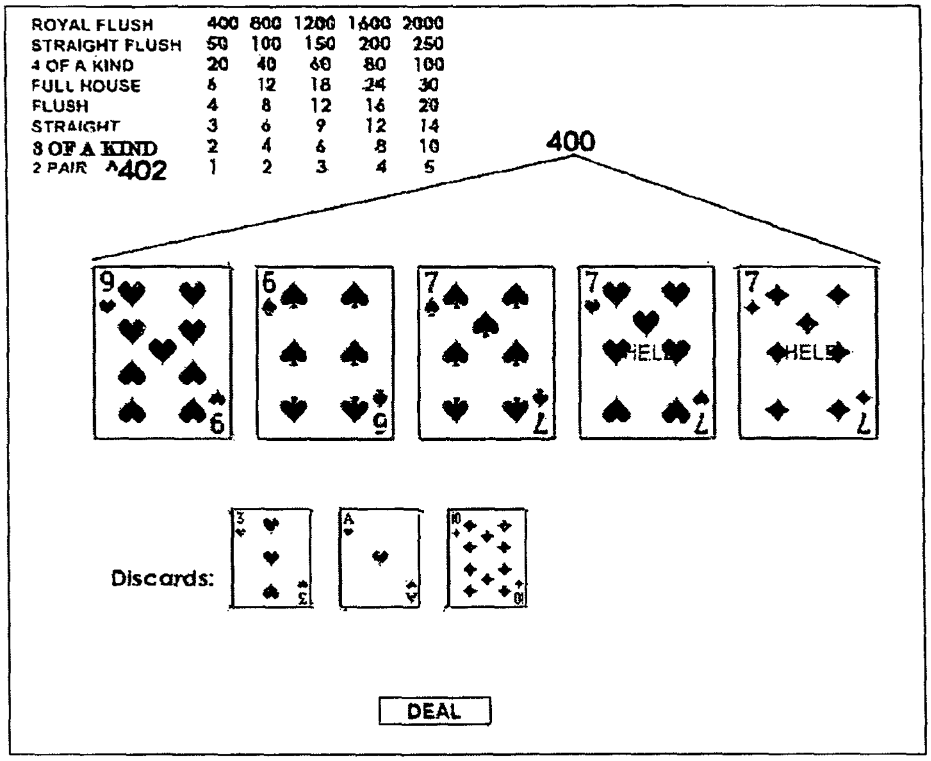
FIG. 4 is a screen shot illustrating a third phase of the present invention, according to an embodiment of the present invention.

FIG. 4 is a screen shot illustrating a third phase of the present invention, according to an embodiment of the present invention.

The computer (video poker machine) holds the cards selected to be held and replaces the non-held cards with new cards. A third (final) hand 400 is dealt/displayed which comprises the held cards from phase 2 as well as new cards which replaced the held cards. This corresponds to operation 108, from FIG. 1.

The third hand 400 is the final hand, and the game is now over. The rank of the hand is determined (see operation 110, from FIG. 1), and if the player has a winning hand the paytable can have an indicator 402 highlighting the rank of the paying hand, and also the amount of money won (not pictured). In this case, the rank of the hand is 3 of a kind. If the player has a winning hand at this phase, the player is paid (see operation 112 from FIG. 1). The player can then optionally begin a new game.

It is noted that typically the same 52 card deck is used for all phases of each game, and is typically shuffled at the beginning. Other non-standard decks can be used with the game as well.

Figure 5:
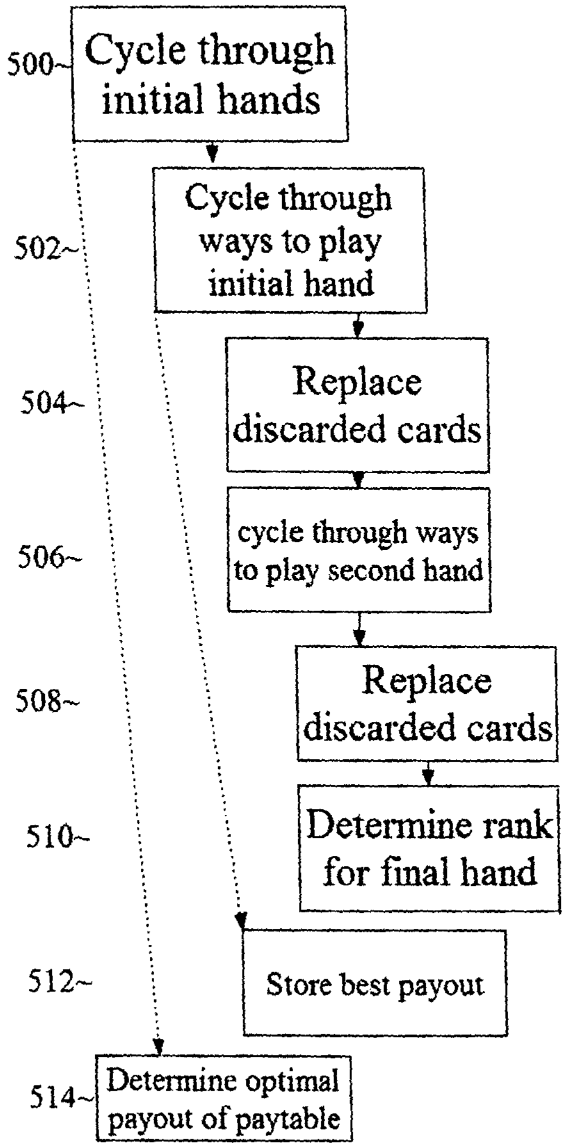
FIG. 5 is a flowchart illustrating a calculation of a return for a paytable for the present invention, according to an embodiment of the present invention.

In order to make the game described above viable for a casino, a paytable must be computed which has an optimal return in an acceptable casino range. The optimal return can be defined as the best possible return for a player that plays a game perfectly. A typical acceptable casino range would comprise a return between 94% and 104%. The return should be set high enough to encourage players to play, but low enough so that the casino will still make a profit. Note that games that return over 100% can still return a profit to the casino if all players do not follow the optimum strategy FIG. 5 is a flowchart illustrating a calculation of a return for a paytable for the present invention, according to an embodiment of the present invention.

A paytable can be designed by a game designer to choose the payouts the designer wishes. Of course, the paytable should result in an acceptable optimal return. A calculation is performed to determine the optimal return of the paytable.

The calculation starts with operation 500, which cycles through all initial 5 card hands (2,598,960—which is computed as 52!/(47!*5!).

The calculation then proceeds to operation 502, which cycles through all 32 ways to play the initial hand. There are 32 ways to play the initial hand because each of the five cards can be held or discarded, so 2^5=32.

The calculation then proceeds to operation 504, which replaces the discarded cards from each operation 502 in all possible ways to create a second hand. If all five cards are discarded, then there are 1,533,939 ways to replace the discards 47!/(42!*5!). If four cards are discarded, then there are 47!/(43!*4!) ways to replace the discards, etc.

The calculation then proceeds to operation 506, which cycles through all 32 ways to play the second hand.

The calculation then proceeds to operation 508, which replaces the discarded cards from each operation 506 in all possible ways to create a third and final hand.

The calculation then proceeds to operation 510, which determines (and stores) a payout for the final hand depending on the rank of the hand and the paytable being used.

When operations 502-510 are completed, the calculation proceeds to operation 512, which stores the best payout of all of the ways to play the particular initial hand is saved. The calculation then returns to operation 500 to cycle through the next dealt hand.

When all initial hands are cycled through in operation 500 (invoking operations 502-512), the calculation then proceeds to operation 514 which determines the optimal payout of the paytable. This is determined by summing all of the saved best payouts from operation 512 and dividing by the number of initial hands.

If the optimal return of the paytable is not at a level acceptable to the game designer, the designer can continuously adjust payouts of the table and perform the above described method again.

The above described calculation, when the player discards all 5 cards initially and all five cards again, requires a large number of hands to be dealt.

A number of optional shortcuts can be implemented in order to cut down on the processing time.

First, although there are 2,598,960 ways to choose the initial 5 cards out of a 52-card deck there are only 134,459 classes of hands. Analyzing each class and weighting by the number of similar classes produces the same results as analyzing all 2,598,960 hands. For example if the player has four kings and a queen it does not make any difference what suit the queen is. Rather than analyzing four hands (one for each suit of the queen) we can pick an arbitrary suit for the queen and weight the results by 4.

Second, if it can be shown that the player should never discard all five cards on the initial deal then this option can be ignored. This is the most time consuming of the 32 ways to play the hand due to the large number of ways to choose 5 replacement cards out of 47.

Third, holding one card and discarding four on the initial deal is still time consuming. However depending on the card kept the expected value can be predicted within a small range, varying only because of which cards are discarded. A time saving measure that can be implemented is to determine an average value for keeping each of the 13 ranks on the initial deal. This could be determined by cycling through all 495 (12!/(8!*4!)) ways of choosing 4 ranks out of 12 for the discarded cards, assuming it can be shown the player should never hold a singleton over a pair. Arbitrary suits can be assigned, so that none of the discarded suits match the card held. This shortcut will admittedly not produce perfect results but the degree of error should be very small.

Also, another shortcut can be utilized which skips the processing of obviously bad plays. For example, the program only holds two cards if they are any of the following: (1) a pair, (2) suited cards, (3) consecutive cards. A player should typically not hold 2 cards if one of these conditions were not met.

Table I is an example of an optimal paytable computed using the above described methods. A player would have utilized optimal strategy on both draws in order to achieve these optimal results.

TABLE 1

| Hand | Prob | Pays | Return |
|---|---|---|---|
| Nonpaying hand | 0.594120 | 0 | 0.000000 |
| Two pair | 0.185606 | 1 | 0.185606 |
| Three of a kind | 0.117042 | 2 | 0.234084 |
| Straight | 0.026194 | 3 | 0.078583 |
| Flush | 0.038588 | 3 | 0.115764 |
| Full House | 0.030974 | 5 | 0.154872 |
| Four of a kind | 0.006867 | 20 | 0.137333 |
| Straight Flush | 0.000478 | 50 | 0.023902 |
| Royal Flush | 0.000130 | 500 | 0.065058 |
| Total | 1.000000 | | 0.995202 |

The probability column is the probability of that hands resulting after two draws if the player uses optimal strategy. This can be determined by tabulating the ranks of the final best hands in operation 510 from FIG. 5, and dividing by the total number of hands. The return column represents the percentage of the final return that the respective rank contributes to the overall return. This can be determined for each rank by multiplying the payout column by the respective payout column.

Note the paytable in Table I has a final optimal return of 0.995202 (99.5202%). This is obtained by summing all of the returns for the individual ranks. The return of 99.5% is an ideal return for this game, as it is high enough to attract players, but a casino will still make a profit, especially since most players will not be utilizing optimal strategy.

The results in Table I were created using shortcuts as described above. However, due to the shortcuts taken, the accuracy of the results in Table I contains an X margin of error within 0.1%.

Appendix A contains one example of code written to implement the above method, written in C++. Of course, most other programming languages can be used to implement the method.

In another embodiment of the present invention, a conditional second draw version of the present invention can be implemented. In this embodiment, a second draw can invoked upon certain conditions, but otherwise is not offered to the player. For example, a one draw game can be offered, but if the player achieves a "four to a royal" hand after the first draw, the game automatically offers the player a second draw. In this way, the player has an additional try to make a royal flush. For the second draw, the player can either be limited to discarding a limited number of cards (such as 1, 2, 3, 4 or 5) or can discard any amount of cards (1-5) the player wishes. In a less preferred embodiment, for the first draw the player can either be limited to discarding a limited number of cards (such as 1, 2, 3, 4 or 5) or can discard any amount of cards (1-5) the player wishes.

Figure 6:
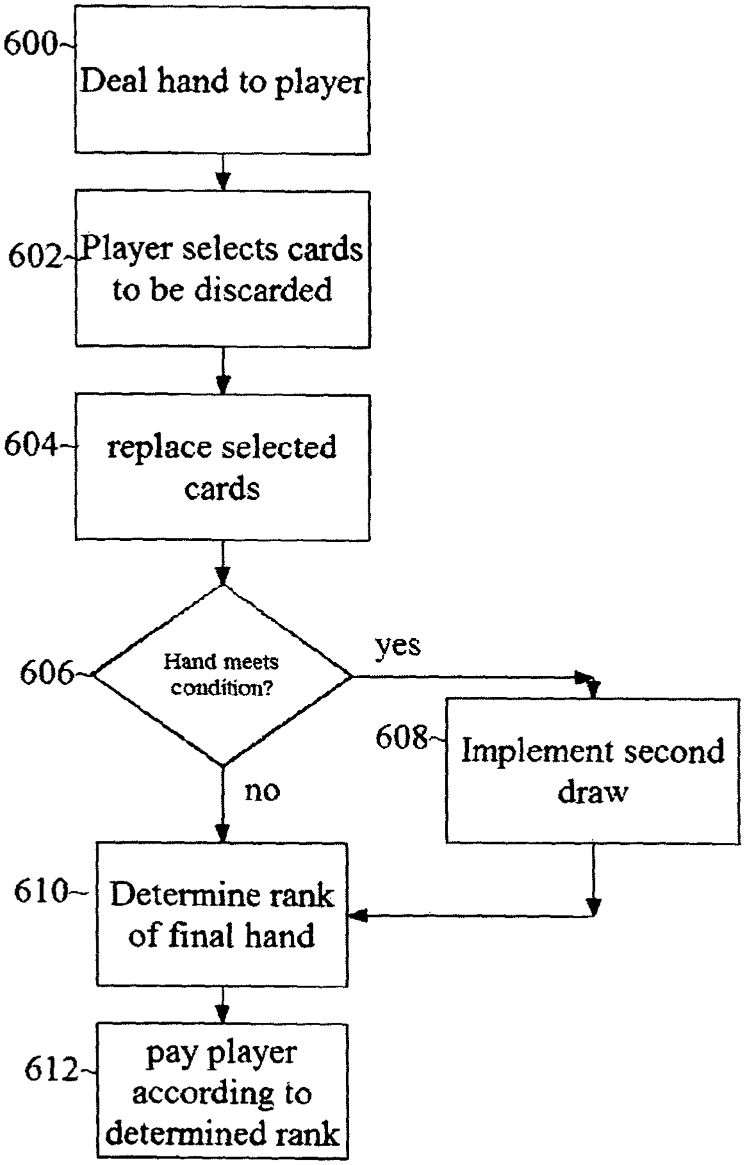
FIG. 6 is a flowchart illustrating a conditional second draw version, according to an embodiment of the present invention.

FIG. 6 is a flowchart illustrating a conditional second draw version, according to an embodiment of the present invention.

The game starts at operation 600, which deals to a player a first five card hand. Before a hand is dealt, any initialization can be performed, such as shuffling a 52 card deck.

The game then proceeds to operation 602, which allows the player to select from 0-5 cards from the first hand to be discarded.

The game then proceeds to operation 604, which then replaces the selected cards from operation 200 with newly dealt cards, forming a second hand.

The game then proceeds to operation 606, which checks the second hand for a predetermined condition(s). The predetermined criteria typically a type of hand, regardless of whether it would comprise a paying hand or not. For example, one predetermined criteria could whether the hand comprises a "four to a royal" hand. A four to a royal hand is where the player has four cards which can comprise a royal flush, but a fifth card to complete the royal flush is needed. If the check returns a negative result (the hand does not meet the predefined criteria), then the second hand is considered the "final hand" and the game proceeds to operation 610.

If the check in operation 606 determines that the predetermined condition(s) is met, then the game then proceeds to operation 608, which allows the player to select card(s) from the second hand to be discarded. The player may be limited to selecting a fixed number of cards (such as one card), or the player may be allowed to select any amount of cards to select the player wishes. Once those card(s) are selected, then they are discarded and replaced with newly drawn card(s) to comprise a final hand.

From operations 606 or 608, the game proceeds to operation 610, which determines a rank of the final hand. The rank can be determined by comparing the cards in the final hand with values for each of the ranks. Sorting the final hand from lowest to highest before comparing can make this process easier to program.

The game then proceeds to operation 612, which pays the player according to the determined rank. Of course, if the player does not have a winning hand, the player is not paid. The game can then return to operation 600 for a new game.

Figure 7:
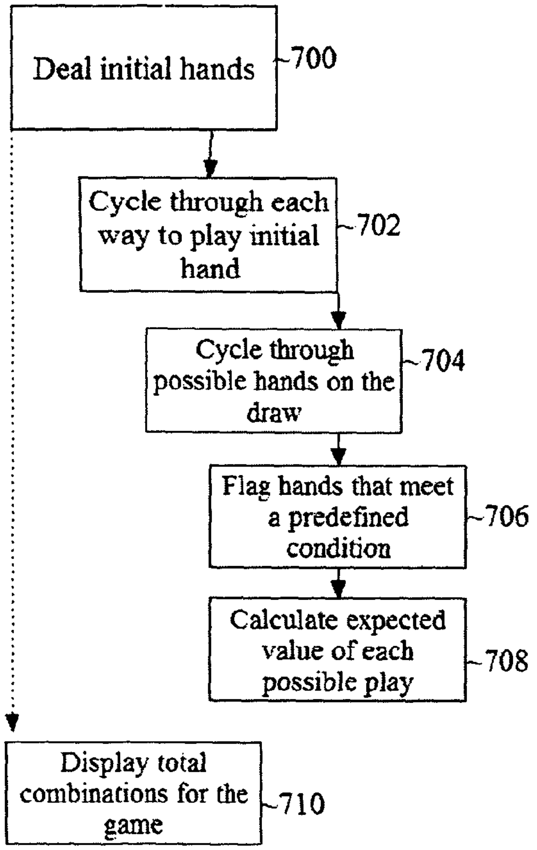

The paytable in this embodiment should be adjusted to compensate for the additional player advantage of a second draw in certain circumstances. FIG. 7 is a flowchart illustrating a method of computing such an adjusted paytable, according to an embodiment of the present invention.

In operation 700, the method deals initial hands. The number of ways to arrange the initial 5 cards out of a 52-card deck is 2,598,960. However in video poker many initial hands have exactly the same value and possible outcomes. For example if the initial hand were four queens and a king it would not make any difference what suit the king was. So to speed analysis it would be fair to only analyze this hand once, giving the king an arbitrary suit, and weighting the possible outcomes by 4 (one for each possible suit of the king). Combining all similar hands the number of initial hands necessary to evaluate is only 134,459.

After initial hands are dealt in operation 700, the operation proceeds to operation 702 which cycles through each way to play each dealt initial hand. After the initial hand is dealt the player may choose to keep or discard each card. Therefore there are $2^5=32$ possible ways to play each hand. The number of possible replacement cards depends on the number of cards kept. Table I shows the number of ways to choose each number of discards out of the initial five cards and the total combinations of replacement cards. The product column shows the product of these two numbers.

TABLE I

| Discards | Sets | Draw Combinations | Product |
|---|---|---|---|
| 0 | 1 | 1 | 1 |
| 1 | 5 | 47 | 235 |
| 2 | 10 | 1081 | 10810 |
| 3 | 10 | 16215 | 162150 |
| 4 | 5 | 178365 | 891825 |
| 5 | 1 | 1533939 | 1533939 |
| Total | 32 | | 2598960 |

The lower right cell shows the number of possible combinations on the draw is also conveniently 2,598,960. In other words given any initial hand all final hands are still possible. A slow method of analyzing standard video poker would be to score all 2598960 possible hands on the draw. Even with the shortcut limiting the initial hands to 134,459, analyzing all 2598960 draw hands for each one would necessitate scoring over 349 billion hands.

To speed up processing time, the method can only score each possible hand once. It takes only a few seconds to score 2,598,960 hands. Each hand can be numbered sequentially and the hand value is stored in an array. Likewise it is determined if each possible hand contains four to a royal flush and another array of 2,598,960 elements is used to store whether each hand contains exactly four to a royal.

For each of the 134,459 initial hands the computer proceeds to operation 704 which loops through all 2,598,960 possible hands on the draw. For each one the method checks to see which cards are common to both the initial hand and the final hand. According to which cards are common to both the method will increment the value of a two dimensional array, one dimension for each way to play the initial hand and another for each possible outcome of the final hand. To be more specific each card position is given an indicator of a power of 2 (1, 2, 4, 8, and 16). If an initial card is part of the final hand a counter is incremented with the corresponding power of 2 for that card position.

In addition, as the program cycles through all 2,598,960 final hands it flag hands that meet a predefined condition, in this case having four to a royal flush, in operation 706. In these cases the hand is sent to another subroutine which evaluates the possible outcomes of a second draw. These possible outcomes are then stored in another two dimensional array for the possible outcomes of the second draw. The program is careful to consider which cards have already been removed from the deck, either from the initial deal or the first draw.

After looping through all 2,598,960 possible final hands, the method then proceeds to operation 708 which calculates the expected value of each possible play. This is done by weighting each payoff and its probability for all 32 ways to play each hand. In addition the expected value of the second draw is added to each possible play. The play with the greatest expected value is selected and the possible outcomes stored in an array for the entire game.

The possible draw combinations should be weighted inversely so that each possible play has the same weight. For example if the player discards all five initial cards there are 1,533,939 ways to get 5 out of 47 replacements cards. However if the player only discards one card there are 47 ways to get a replacement card. So the draw combinations are weighted proportionally to the inverse of their total.

When all the initial hands are cycled through, the method proceeds to operation 710 which displays the total combinations for the entire game. Given the frequency of each final hand, both on the first and second draw, the total return can be easily calculated.

Table II shows the results for the first draw in a Jacks or Better game.

TABLE II

| Hand | Pays | Combinations | Probability | Return |
|---|---|---|---|---|
| Nothing | 0 | 919, 136, 157, 346, 512 | 0.548937 | 0.000000 |
| Jacks or Better | 1 | 351, 887, 245, 651, 872 | 0.210158 | 0.210158 |
| Two pair | 2 | 215, 333, 068, 522, 320 | 0.128604 | 0.257208 |
| Three of a kind | 3 | 124, 087, 393, 826, 928 | 0.074109 | 0.222327 |
| Straight | 4 | 18, 008, 776, 947, 168 | 0.010755 | 0.043022 |
| Flush | 5 | 17, 847, 429, 833, 520 | 0.010659 | 0.053295 |
| Full House | 6 | 19, 161, 504, 706, 176 | 0.011444 | 0.068663 |
| Four of a kind | 20 | 3, 937, 460, 675, 904 | 0.002352 | 0.047032 |
| Straight Flush | 50 | 168, 076, 417, 824 | 0.000100 | 0.005019 |
| Royal Flush | 800 | 52, 636, 568, 544 | 0.000031 | 0.025149 |
| No Hand | 0 | 4,771, 612, 948, 032 | 0.002850 | 0.000000 |
| Total | | 1,674, 391, 363, 444, 800 | 1.000000 | 0.931872 |

The "No Hand" column means the player had 4 to a royal and accepted the option for a second draw. The probability column shows this happens 0.285% of the time, or once every 351 hands. The return on the first draw is 93.19%.

Table III shows the results on the second draw. Note that 99.715% of the time the player will not get a second draw, because he didn't have four to a royal on the first draw. The lower right cell shows the second draw contributes 5.53% to the game return.

TABLE III

| Hand | Pays | Combinations | Probability | Return |
|---|---|---|---|---|
| Nothing | 0 | 2, 543, 373, 927, 048 | 0.001519 | 0.000000 |
| Jacks or Better | 1 | 967, 907, 545, 944 | 0.000578 | 0.000578 |
| Two pair | 2 | 0 | 0.000000 | 0.000000 |
| Three of a kind | 3 | 0 | 0.000000 | 0.000000 |
| Straight | 4 | 354, 825, 920, 376 | 0.000212 | 0.000848 |
| Flush | 5 | 778, 947, 141, 588 | 0.000465 | 0.002326 |
| Full House | 6 | 0 | 0.000000 | 0.000000 |
| Four of a kind | 20 | 0 | 0.000000 | 0.000000 |
| Straight Flush | 50 | 19, 827, 215, 004 | 0.000012 | 0.000592 |
| Royal Flush | 800 | 106, 731, 198, 072 | 0.000064 | 0.050995 |
| No Hand | 0 | 1, 669, 619, 529, 402, 040 | 0.997150 | 0.000000 |
| Total | | 1, 674, 391, 142, 350, 070 | 1.000000 | 0.055338 |

Table IV shows the final outcome of the player hand and the total return of the game of 98.72%.

TABLE IV

| Hand | Pays | Combinations | Probability | Return |
|---|---|---|---|---|
| Nothing | 0 | 921, 679, 531, 273, 560 | 0.550456 | 0.000000 |
| Jacks or better | 1 | 352, 855, 153, 197, 816 | 0.210736 | 0.210736 |
| Two pair | 2 | 215, 333, 068, 522, 320 | 0.128604 | 0.257208 |
| Three of a kind | 3 | 124, 087, 393, 826, 928 | 0.074109 | 0.222327 |
| Straight | 4 | 18, 363, 602, 867, 544 | 0.010967 | 0.043869 |
| Flush | 5 | 18, 626, 376, 975, 108 | 0.011124 | 0.055621 |
| Full House | 6 | 19, 161, 504, 706, 176 | 0.011444 | 0.068663 |
| Four of a kind | 20 | 3, 937, 460, 675, 904 | 0.002352 | 0.047032 |
| Straight Flush | 50 | 187, 903, 632, 828 | 0.000112 | 0.005611 |
| Royal Flush | 800 | 159, 367, 766, 616 | 0.000095 | 0.076144 |
| Total | | 1, 674, 391, 363, 444, 800 | 1.000000 | 0.987211 |

Table V compares the probability of each hand in regular video poker with this embodiment (offering a second draw on a four to a royal hand), both based on their respective optimal strategy for the given pay table. Note the greatly increased probability of getting a royal flush. In this paytable this game results in 3.82 times as many royals as regular video poker.

TABLE V

| Hand | Regular | Second draw on 4 to a royal | Regular | Second draw on 4 to a royal |
|---|---|---|---|---|
| Nothing | 0.545080 | 0.550456 | 1 in 1.83 | 1 in 1.82 |
| Jacks or better | 0.215040 | 0.210736 | 1 in 4.65 | 1 in 4.75 |
| Two pair | 0.129249 | 0.128604 | 1 in 7.74 | 1 in 7.78 |
| Three of a kind | 0.074428 | 0.074109 | 1 in 13.44 | 1 in 13.49 |
| Straight | 0.011284 | 0.010967 | 1 in 88.62 | 1 in 91.18 |
| Flush | 0.010913 | 0.011124 | 1 in 91.63 | 1 in 89.89 |
| Full House | 0.011511 | 0.011444 | 1 in 86.88 | 1 in 87.38 |
| Four of a kind | 0.002362 | 0.002352 | 1 in 423.35 | 1 in 425.25 |
| Straight Flush | 0.000108 | 0.000112 | 1 in 9250.88 | 1 in 8910.9 |
| Royal Flush | 0.000025 | 0.000095 | 1 in 40173.19 | 1 in 10506.46 |

Appendix B contains one example of code written to implement the above method, written in C++. Of course, most other programming languages can be used to implement the method.

It is helpful to compare the methods illustrated in FIGS. 5 and 7 (and the code in Appendix A and B, respectively). The first method (illustrated in FIG. 5, the accompanying description and code attached in Appendix A) uses shortcuts (described above) to make the processing time more manageable. The shortcuts come at the expense of a very slight decrease in accuracy.

The second method (illustrated in FIG. 7, the accompanying description, and the code attached in Appendix B) uses an exact method by cycling through every possible hand with no shortcuts taken that decrease accuracy.

Some games, such as the basic double draw game, are betted suited for the first method of analysis because the second will take too long. On the other hand, the conditional double draw game contains less combinations to deal and can be analyzed by the second, more exact method.

In addition to using a four to a royal hand as the triggering condition for a second draw, any other hand can be used as well. For example, a hand comprising four to a straight flush and/or four to a royal can be used. A hand comprising three of a kind can also be used. A hand that comprises all nonpaying hands can also be used (i.e. if after the first draw a player does not have a paying hand, the player can then be given a second draw). Any paying or nonpaying hand, and any combinations particular paying and/or nonpaying hands can be used as the triggering criteria/criterion. Paytables for these games can be generated using the methods described above.

In a further embodiment of the present invention, multiple hands can be played simultaneously. In this manner, players can enjoy faster play. Playing multiple hands can be accomplished at least three ways.

Figure 8:
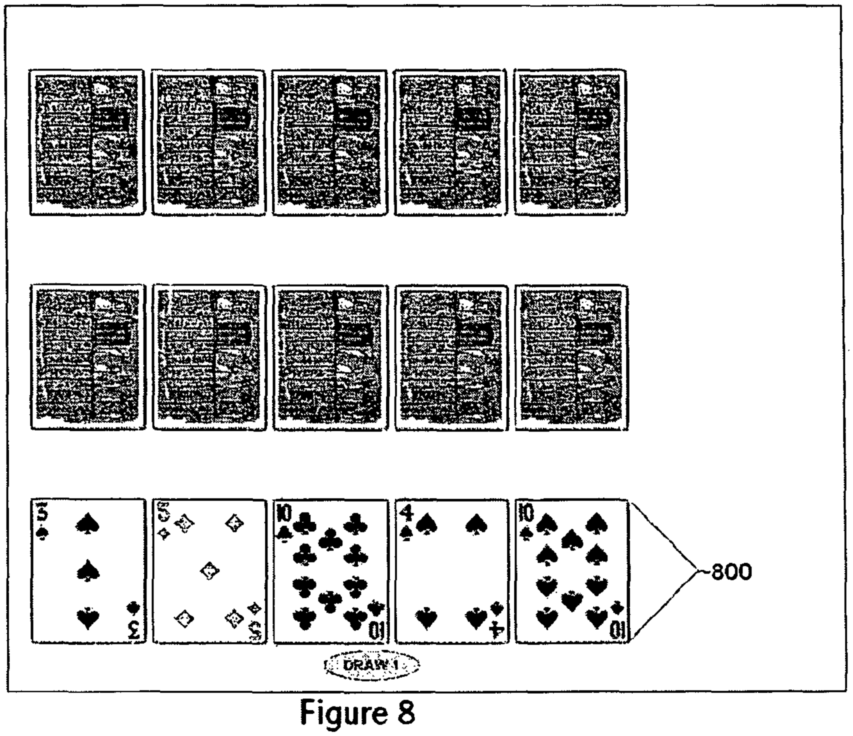
FIG. 8 is a screenshot illustrating a first phase of a multiple hand embodiment, according to an embodiment of the present invention.

FIG. 8 is a screenshot illustrating a first phase of a multiple hand embodiment, according to an embodiment of the present invention.

A bottom first hand 800 is dealt, with the cards: 3 spades, 5 diamonds, 10 clubs, 4 spades, and 10 spades. Assume a player holds the 10 clubs and the 10 spades, and then draws.

Figure 9:
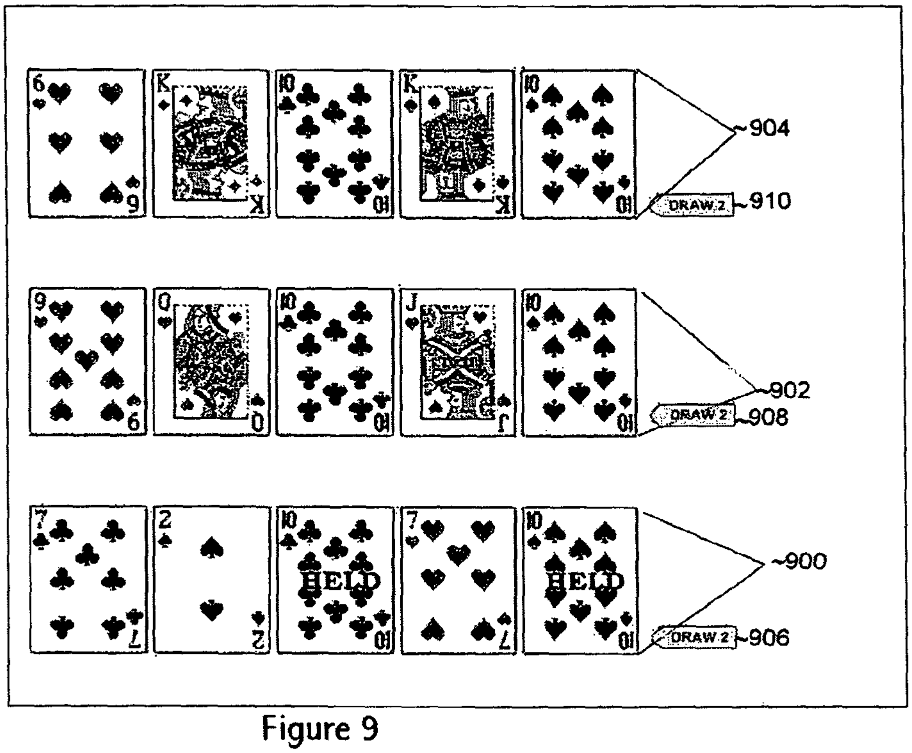
FIG. 9 is a screenshot illustrating a second phase of a multiple hand embodiment, according to an embodiment of the present invention.

FIG. 9 is a screenshot illustrating a second phase of a multiple hand embodiment, according to an embodiment of the present invention.

The game then deals three (or any number can be used) rows of hands, while keeping the selected discards (10 clubs and 10 spades). Thus, there is a bottom second hand 800, a middle second hand 802, and a top second hand 804. Each of these three hands maintains the cards that were selected to be held in the first phase. Also illustrated are three draw buttons, a bottom draw button 806, a middle draw button 808, and a top draw button 810.

A player selects his or her discards from each row of cards. The player then can push each of the three draw buttons in order to receive replacement cards for the selected cards for each row. In the example illustrated in FIG. 9, the bottom hand comprises: 7 clubs, 2 spades, 10 clubs, 7 hears, 10 spades. The player decides to keep the 7 clubs, 10 clubs, 7 hearts, and 10 spades, and then presses the bottom draw button 806.

Figure 10:
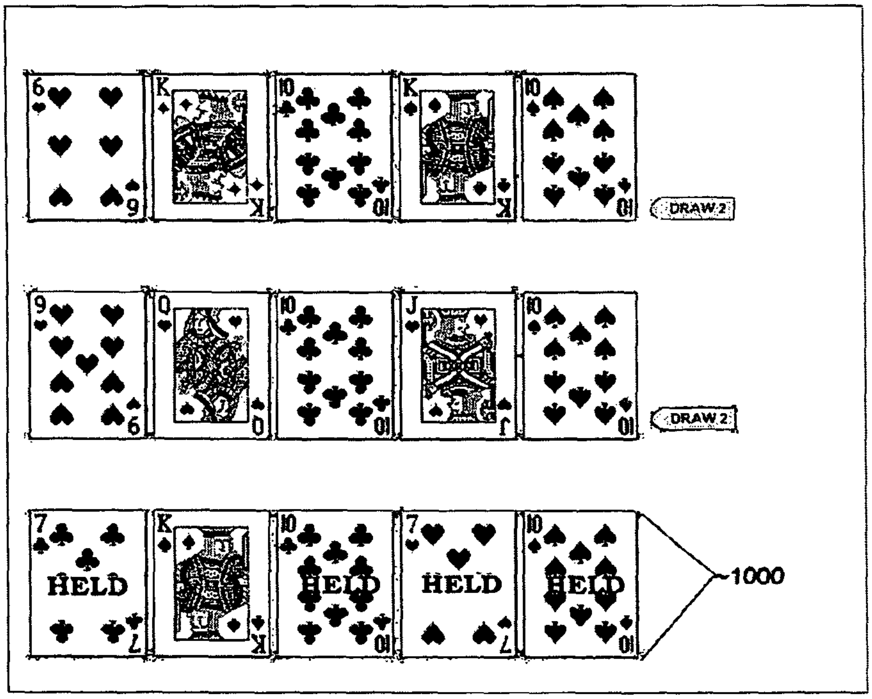
FIG. 10 is a screenshot illustrating a third and final phase of a multiple hand embodiment, according to an embodiment of the present invention.

FIG. 10 is a screenshot illustrating a third and final phase of a multiple hand embodiment, according to an embodiment of the present invention.

A bottom final hand 1000 is completed by redealing cards that were previously not selected to be held. The bottom final hand 1000 comprises: 7 clubs, kind spades, 10 clubs, 7 hears, and 10 clubs, with a rank of 2 pair. While not pictured, the middle hand and the top hand can be completed in the same manner.

Figure 11:
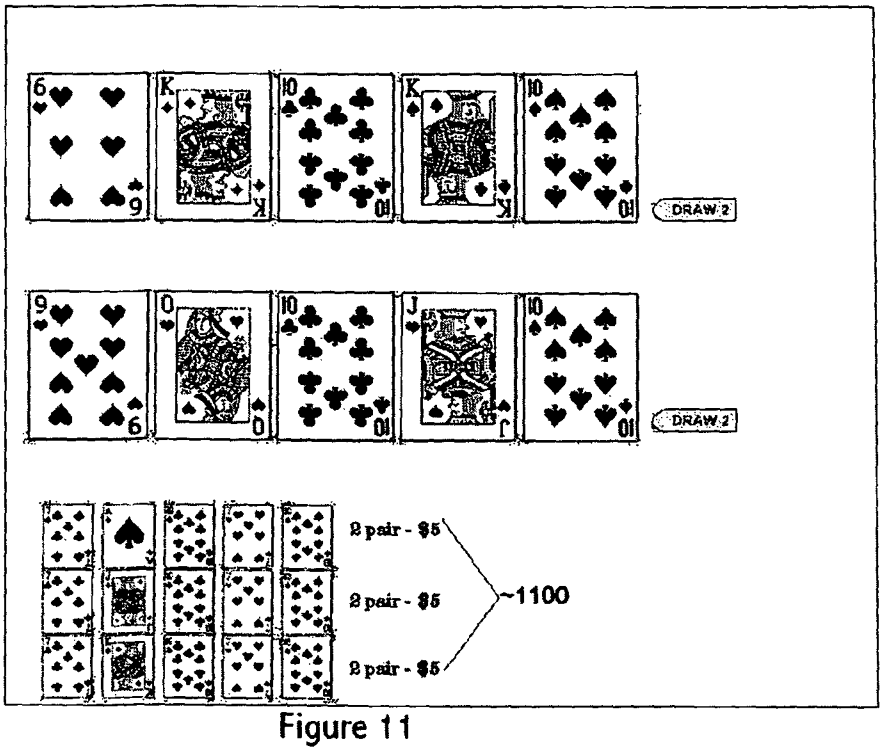
FIG. 11 is a screenshot illustrated a third and final phase of another multiple hand embodiment, according to an embodiment of the present invention.

FIG. 11 is a screenshot illustrated a third and final phase of another multiple hand embodiment, according to an embodiment of the present invention.

FIG. 11 follows FIGS. 8 and 9. Instead of dealing one hand for each row after the final selection as illustrated in FIG. 10, the game can deal multiple hands (for example 3, although any number can be used) for the final hand, while keeping the selected cards. In the case of FIG. 10, 3 hands are dealt after the second draw for the bottom hand. Each hand is ranked and paid appropriated.

Figure 12:
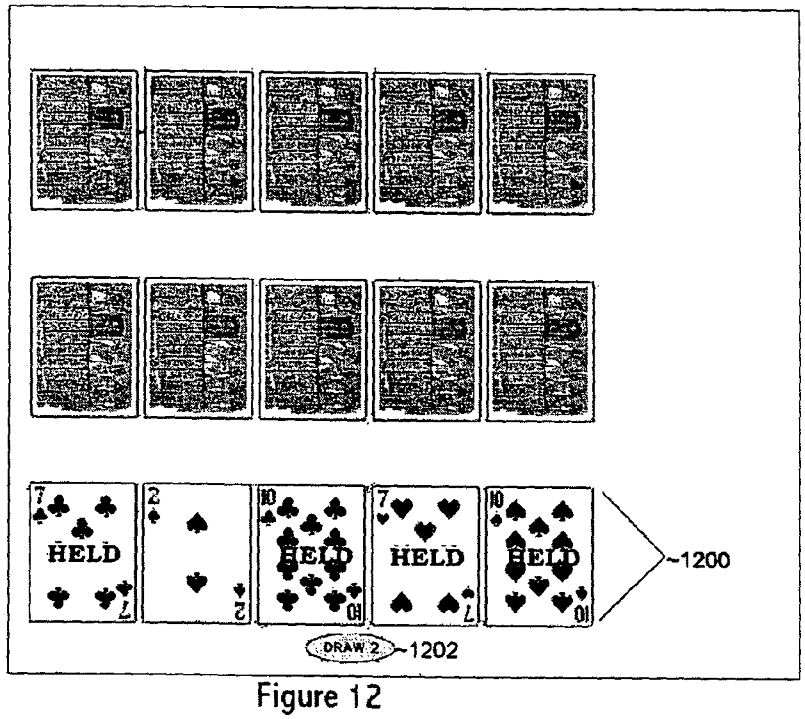
FIG. 12 is a screenshot illustrated a second phase of another multiple hand embodiment, according to an embodiment of the present invention.

FIG. 12 is a screenshot illustrated a second phase of another multiple hand embodiment, according to an embodiment of the present invention.

After the operations as described for FIG. 8, the game can deal a second bottom hand 1200, but not deal a middle or top hand. The player then selects the cards to keep from the bottom second hand 1200. In this case the player decides to keep the 7 clubs, 10 clubs, 8 hearts and 10 spades, while discarding the 2 spades. The player presses the "draw 2" button 1202 to proceed to the third and final phase of the game.

Figure 13:
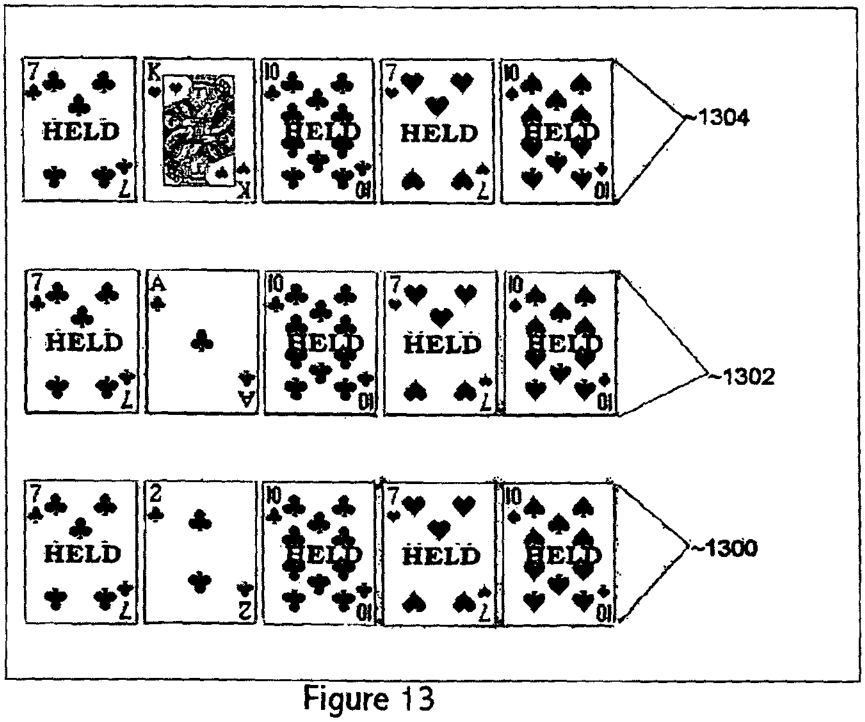
FIG. 13 is a screenshot illustrated a third and final phase of another multiple hand embodiment, according to an embodiment of the present invention.

FIG. 13 is a screenshot illustrated a third and final phase of another multiple hand embodiment, according to an embodiment of the present invention.

After the player has made his or her second selection of discards (as described in the accompanying description to FIG. 12), the game then deals final hands (any number of final hands can be used).

FIG. 13 illustrates a bottom final hand 1300, a middle final hand 1302, and a top final hand 1304. The hands all comprise cards kept from the second selection, while replacing any card(s) that were not selected to be held.

The multiple hand embodiments described above can be applied to any of the games described herein. It is also noted that each "line" of the multiple hand embodiments (i.e. first hand, second hand, final hand) is dealt from its own deck.

In yet a further variation of the present invention, a standard 52 card deck can be used with one additional (or multiple) "double draw card(s)." A player by default will receive one draw after the initial deal. However, if the player is dealt the "double draw card" (either on the initial deal or on the first draw), then the player will be entitled to a second draw. The double draw card should be indicated in any way, such as being shown but then replaced by the next card in the deck so game play proceeds normally. Alternatively, instead of using a double draw card, the double draw can be triggered at random using a predetermined probability.

The double draw card variation of the game can be analyzed by using a combination of the first calculation method described above and a method for analyzing a single draw video poker game (by running through all possible initial hands, draw combinations, and then taking the best possible hand to be made for each initial hand). If the player receives a double draw card on the deal the first method described would be used. Otherwise if the player did not get a double draw card on the deal the program would calculate the return using the method just described above for single draw video poker. A weighted average of the results of both methods would be taken according to the probability of getting a second draw card on the first draw. This method applies to a game where the double draw card can come out on the initial deal only. In order to analyze a game where the double draw card could come out on the first draw as well, then if the player did not get a double draw card on the initial deal then the expected value should be determined using both the double draw method and that of single draw video poker. A weighted average should be taken according to the probability of getting a double draw card on the first draw of each play on the deal, with the highest expected value taken.

It is further noted that any of the games described herein can be played with any kind of deck, either standard or non-standard. Wildcards can also be used. Analysis of payouts on any variation of the game can be achieved using the methods described herein.

Figure 14:
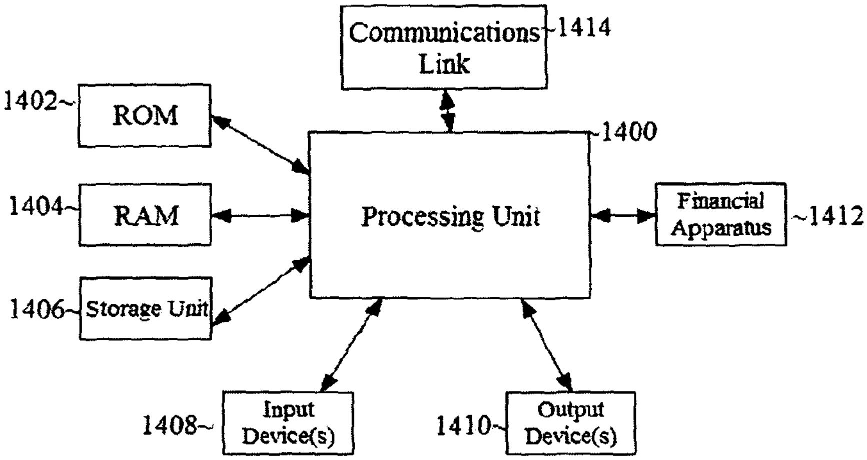
FIG. 14 is a block diagram illustrating one example of hardware that can be used to implement the present invention, according to an embodiment of the present invention.

FIG. 14 is a block diagram illustrating one example of hardware that can be used to implement the present invention, according to an embodiment of the present invention. Typically, an electronic gaming device (EGD) is used to implement the present invention.

A processing unit 1400 is connected to a ROM 1402, RAM 1404, and a storage unit 1406 such as a hard drive, CD-ROM, etc. The processing unit 1400 is also connected to an input device(s) 1408 such as a touch sensitive display, buttons, keyboard, mouse, etc. The processing unit 1400 is also connected to an output device(s) 1410 such as a video display, audio output devices, etc. The processing unit 1400 is also connected to a financial apparatus 1412, which can accept payments and handle all facets of financial transactions. The processing unit 1400 is also connected to a communications link 1414 which connects the gaming device to a casino network or other communications network.

It is also noted that any and/or all of the above embodiments, configurations, variations of the present invention described above can mixed and matched and used in any combination with one another. Any claim herein can be combined with any others (unless the results are nonsensical). Further, any mathematical formula given above also includes its mathematical equivalents, and also variations thereof such as multiplying any of the individual terms of a formula by a constant(s) or other variable.

Moreover, any description of a component or embodiment herein also includes hardware, software, and configurations which already exist in the prior art and may be necessary to the operation of such component(s) or embodiment(s).

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus to play a wagering game, the apparatus comprising:
- a touch sensitive screen configured to both receive input and display output;
- a processor connected to the touch sensitive screen, the processor configured to perform:
- a financial apparatus configured to receive cash from a player;
- provide an electronic random number generator which is used to determine values of all newly dealt cards;
- receive a wager from the player;
- deal a first initial hand of cards face up;
- receive a selection from the player of first hand hold card(s) from the first initial hand;
- form a second initial hand using the first hand hold card(s), the second initial hand being in a different row than the first initial hand;
- form a third initial hand using the first hand hold card(s), the third initial hand being in a different row than the second initial hand;
- replace all card(s) in the first initial hand which are not first hand hold card(s) with newly dealt face up card(s) to form a first intermediate hand, the first intermediate hand being in a same row as the first initial hand, the first intermediate hand not triggering a payout;
- deal new card(s) face up in the second initial hand to form a second intermediate hand, the second intermediate hand being in a same row as the second initial hand, the second intermediate hand not triggering a payout;
- deal new card(s) face up in the third initial hand to form a third intermediate hand, the third intermediate hand being in a same row as the third initial hand, the third intermediate hand not triggering a payout;
- receive a selection from the player without receiving an additional wager of first intermediate hand hold card(s) from the first intermediate hand and generating multiple first final hands, each first final hand formed using the first intermediate hand hold card(s) and newly dealt face up card(s);
- receive a selection from the player without receiving an additional wager of second intermediate hand hold card(s) from the second intermediate hand and generating multiple second final hands, each second final hand formed using the second intermediate hand hold card(s) and newly dealt face up card(s);
- receive a selection from the player without receiving an additional wager of third intermediate hand hold card(s) from the third intermediate hand and generating multiple third final hands, each third final hand formed using the third intermediate hand hold card(s) and newly dealt face up card(s);
- evaluate ranks of all final hands and paying any respective awards to the player.

2. An apparatus to play a wagering game, the apparatus comprising:
- a touch sensitive screen configured to both receive input unit and display output unit;
- a financial apparatus configured to receive cash from a player;
- a processor connected to the touch sensitive screen, the processor configured to perform:
- provide an electronic random number generator which is used to determine values of all newly dealt cards;
- receive a wager from the player;
- deal a first initial hand of cards face up;
- receive a selection from the player of first hand hold card(s) from the first initial hand;
- replace all card(s) in the first initial hand which are not first hand hold card(s) with newly dealt face up card(s) to form a first intermediate hand, the first intermediate hand being in a same row as the first initial hand;
- display a second intermediate hand, the second intermediate hand being in a different row than the first initial hand, the second intermediate hand comprising copies of the first hand hold card(s) and newly dealt face up card(s) to form the second intermediate hand;
- receive a selection from the player of first intermediate hand hold card(s) from the first intermediate hand and replacing all card(s) in the first intermediate hand which are not first intermediate hand hold card(s) with newly dealt face up card(s) to form a first final hand;
- receive a selection from the player of second intermediate hand hold card(s) from the second intermediate hand and replacing all card(s) in the second intermediate hand which are not second intermediate hand hold card(s) with newly dealt face up card(s) to form a second final hand; and
- pay to the player any awards earned based on an evaluation of ranks of the first final hand and the second final hand,
- wherein the selections received from the player of the first intermediate hand hold card(s) and the second intermediate hand hold card(s) are received without receiving additional wagers from the player.

3. An apparatus to play a wagering game, the apparatus comprising:
- a touch sensitive screen configured to both receive input and display output;
- a financial apparatus configured to receive cash from a player;
- a processor connected to the touch sensitive screen, the processor configured to perform:
- provide an electronic random number generator which is used to determine values of all newly dealt cards;
- receive a wager from the player;
- deal a first initial hand of cards face up;
- receive a selection from the player of first hand hold card(s) from the first initial hand;
- replace all card(s) in the first initial hand which are not first hand hold card(s) with newly dealt face up card(s) to form a first intermediate hand, the first intermediate hand being in a same row as the first initial hand;
- display a second intermediate hand, the second intermediate hand being in a different row than the first initial hand, the second intermediate hand comprising copies of the first hand hold card(s) and newly dealt face up card(s) to form the second intermediate hand cards;
- receive a selection from the player of first intermediate hand hold card(s) from the first intermediate hand and displaying at least two first final hands, each first final hand formed using the first intermediate hand hold card(s) and newly dealt face up card(s);
- receive a selection from the player of second intermediate hand hold card(s) from the second intermediate hand and displaying at least two second final hands, each second final hand formed using the second intermediate hand hold card(s) and newly dealt face up card(s); and pay to the player any awards earned based on an evaluation of ranks of the at least two first final hands and the at least two second final hands, wherein the selections received from the player of the first intermediate hand hold card(s) and the second intermediate hand hold card(s) are received without receiving additional wagers from the player.

4. A method to play a wagering game, the method comprising:

executing instructions on an electronic processor which perform the following operations:

receiving cash inserted by a player into a financial apparatus;

receiving a wager from the player using a touch sensitive screen;

displaying a first initial hand of cards face up on the touch sensitive screen;

receiving, on the touch sensitive screen, a selection from the player of first hand hold card(s) from the first initial hand;

replacing on the touch sensitive screen, all card(s) in the first initial hand which are not first hand hold card(s) with newly dealt face up card(s) determined using an electronic random number generator to form a first intermediate hand, the first intermediate hand being in a same row as the first initial hand;

displaying, on the touch sensitive screen, a second intermediate hand, the second intermediate hand being in a different row than the first initial hand, the second intermediate hand comprising copies of the first hand hold card(s) and newly dealt face up card(s) determined using the electronic random number generator to form the second intermediate hand;

receiving, on the touch sensitive screen, a selection from the player of first intermediate hand hold card(s) from the first intermediate hand and forming a first final hand comprising the first intermediate hand hold card(s) and newly dealt face up card(s) determined using the electronic random number generator;

receiving, on the touch sensitive screen, a selection from the player of second intermediate hand hold card(s) from the second intermediate hand and forming a second final hand comprising the second intermediate hand hold card(s) and newly dealt face up card(s) determined using the electronic random number generator;

paying, on the touch sensitive screen, to the player any awards earned based on an evaluation of ranks of the first final hand and the second final hand, wherein the selections received from the player of the first intermediate hand hold card(s) and the second intermediate hand hold card(s) are received without receiving additional wagers from the player.

* * * * *